(12) United States Patent
Koibuchi et al.

(10) Patent No.: US 7,567,865 B2
(45) Date of Patent: Jul. 28, 2009

(54) VEHICLE BODY MOTION REALIZATION METHOD AND APPARATUS

(75) Inventors: Ken Koibuchi, Susuno (JP); Eiichi Ono, Toyota (JP); Yoshikazu Hattori, Nisshin (JP); Yuji Muragishi, Owariasahi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 522 days.

(21) Appl. No.: 10/577,732

(22) PCT Filed: Nov. 12, 2004

(86) PCT No.: PCT/JP2004/017221

§ 371 (c)(1),
(2), (4) Date: May 2, 2006

(87) PCT Pub. No.: WO2005/047073

PCT Pub. Date: May 26, 2005

(65) Prior Publication Data
US 2007/0055432 A1    Mar. 8, 2007

(30) Foreign Application Priority Data
Nov. 14, 2003    (JP)    ............................. 2003-385729

(51) Int. Cl.
*B60T 8/58*    (2006.01)
*B62D 6/00*    (2006.01)
(52) U.S. Cl. ............................. 701/70; 701/41; 303/146
(58) Field of Classification Search ....................... None
See application file for complete search history.

(56) References Cited

U.S. PATENT DOCUMENTS 6,308,126 B2    10/2001    Yokoyama et al.
6,360,150 B1 *  3/2002    Fukushima et al. ........... 701/41
7,315,777 B2 *  1/2008    Ono ............................. 701/70
2003/0149515 A1 *  8/2003    Hessmert et al. .............. 701/29

FOREIGN PATENT DOCUMENTS

| JP | A 06-099796 | 4/1994 |
| JP | A 11-348753 | 12/1999 |
| JP | A 2003-024177 | 1/2003 |
| JP | A 2003-175749 | 6/2003 |

* cited by examiner

*Primary Examiner*—Michael J. Zanelli
(74) *Attorney, Agent, or Firm*—Oliff & Berridge, PLC

(57) ABSTRACT

Various state amounts of a vehicle body detected by various types of sensors are captured (step 102). A maximum frictional force $F_{imax}$ is calculated for each of wheels (steps 104 to 110). By use of the maximum frictional force $F_{imax}$ and other physical quantities, a performance function not dependent on respective magnitudes of a vehicle body generating force and a yaw moment is defined, which performance function is prepared by means of a performance function in a case in which the vehicle body generating force is larger than the yaw moment, and a performance function in a case in which the vehicle body generating force is not larger than the yaw moment (step 112). A resultant force $q_i$ of tire generating forces acting on respective wheels is calculated by means of a third performance function (step 114), and braking and driving forces of each wheel, and a steering angle of each wheel are obtained by means of the calculated direction in which the resultant force of tire generating forces acts on the wheels (step 116). Based on the obtained braking and driving forces and steering wheel of each of the wheels, these wheels are each controlled (step 118).

5 Claims, 5 Drawing Sheets

VEHICLE BODY MOTION REALIZATION METHOD AND APPARATUS

TECHNICAL FIELD

The present invention relates to a vehicle body motion realization method and apparatus, and particularly to a vehicle body motion realization method and apparatus in which a vehicle realizes a predetermined vehicle body motion.

BACKGROUND ART

Japanese Patent Application No. 2003-024177 discloses four-wheel individual steering and individual braking/driving control which maximizes vehicle body generating force in the process of realizing a desired direction in which vehicle body generating force acts, and a yaw moment. In this technique, a utilization factor of a road surface friction coefficient μ between a tire of each wheel and the road surface (hereinafter referred to as μ utilization factor) derives an optimum control rule which minimizes μ utilization factor on the assumption that the direction in which tire generating force acts is considered as a constant manipulated amount.

Further, Japanese Patent Application Laid-Open (JP-A) No. 11-348753 proposes control of braking force based on slip ratio target values of respective wheels for obtaining target yaw moment, vehicle longitudinal force and lateral force being calculated based on variations of yaw moment, vehicle longitudinal force and lateral force to small variations in the slip ratio between the respective wheels.

PROBLEMS TO BE SOLVED BY THE INVENTION

In the apparatus disclosed in the aforementioned Japanese Patent Application No. 2003-024177, a yaw moment is assumed to be small compared with necessary vehicle body generating force, and an optimum solution is derived based on a performance function corresponding to a ratio between a desired vehicle body generating force and a utilization factor of a road surface friction coefficient that is a friction coefficient between the road surface and a tire on the assumption that a direction in which tire generating force acts on each wheel is in the range of ±π/2 to the direction in which vehicle body generating force acts.

However, at the time of inhibiting a spin occurring on, for example, a road surface of which friction coefficient μ is low, or the like, a required yaw moment becomes larger in relation to the vehicle body generating force, no optimum solution can be derived on the assumption that the direction in which tire generating force acts on each wheel is in the range of ±π/2 to the direction in which vehicle body generating force acts, as described in the apparatus of the aforementioned patent application. Further, in the technique disclosed in the aforementioned JP-A No. 11-348753, a steepest descent calculation method using an inverse matrix of four rows and four columns in a braking force distribution logic for obtaining a slip ratio of each wheel is carried out, and a calculation load thereof is large.

The present invention has been achieved in the aforementioned circumstances, and an object of the present invention is to provide a vehicle body motion realization method and apparatus, which allows realization of a predetermined vehicle body motion irrespective of respective magnitudes of a vehicle body generating force and a yaw moment.

Disclosure of the Invention

In order to achieve the aforementioned object, a first invention is a vehicle body motion realization method in which a direction in which tire generating force acts is calculated for each wheel by means of a performance function including the direction in which the tire generating force acts, so as to realize desired yaw moment and vehicle body generating force for obtaining a predetermined vehicle body motion, and the vehicle body motion is realized by using the calculated direction in which the tire generating force acts, wherein the performance function is a performance function corresponding to a ratio between a sum of respective squares of the desired vehicle body generating force and yaw moment, and a utilization factor of a road surface frictional coefficient, which is a frictional coefficient between a road surface which is supposed to have a constant condition for each of wheels, and a tire.

Namely, according to the aforementioned invention, a direction in which tire generating force acts is calculated for each wheel by means of a performance function including the direction in which the tire generating force acts, so as to realize desired yaw moment and vehicle body generating force for obtaining a predetermined vehicle body motion, and the vehicle body motion is realized by using the calculated direction in which the tire generating force acts.

In this case, when it is assumed that the yaw moment is smaller compared with the vehicle body generating force, even if the direction in which the tire generating force acts is calculated for each wheel by means of a performance function corresponding to the ratio between the desired vehicle body generating force and the utilization factor of a road surface frictional coefficient that is a frictional coefficient between a road surface and a tire, so as to realize the desired yaw moment and vehicle body generating force, in a case in which the yaw moment is not smaller compared with the vehicle body generating force, the predetermined vehicle body motion cannot be properly realized even if the resultant force of tire generating forces is used.

Accordingly, in the present invention, as the performance function used in the present invention, a performance function corresponding to a ratio between the sum of respective squares of the desired vehicle body generating force and yaw moment, and the utilization factor of a road surface frictional coefficient, which is a frictional coefficient between a road surface which is supposed to have a constant condition, and a tire is used.

In this manner, according to the present invention, a performance function including respective magnitudes of the vehicle body generating force and the yaw moment is used. Therefore, as long as the direction in which the tire generating force acts is calculated from the performance function and is used, the predetermined vehicle body motion can be properly realized regardless of a balance between the magnitudes of the desired vehicle body generating force and yaw moment.

Further, the direction in which the tire generating force acts may be calculated for each wheel by carrying out linearization of restriction conditions of the desired yaw moment and vehicle body generating force and using the performance function. Thus, when the restriction conditions of the desired yaw moment and vehicle body generating force are linearized, calculating load can be reduced.

Specifically, for example, when the aforementioned wheels are four in number with two front wheels and two rear wheels, the direction in which the tire generating force acts on each wheel is obtained by means of a pseudo-inverse matrix of two rows and four columns prepared from the two linearized restriction conditions of the desired yaw moment and vehicle body generating force, and from the performance function.

A vehicle body motion realization method according to the second invention comprises: calculating means that calculates a direction in which tire generating force acts for each wheel based on detecting means for detecting state amounts of a vehicle, and a performance function including a direction in which tire generating force acts, so as to realize desired yaw moment and vehicle body generating force for obtaining a predetermined vehicle body motion; and control means that controls a steering angle of each wheel and braking and driving forces of each wheel based on the direction in which the tire generating force acts, which is calculated by said calculating means for each wheel, a value of the performance function used in calculation of the direction in which the tire generating force acts, and a utilization factor of a road surface frictional coefficient, which is a frictional coefficient between a road surface and a tire calculated based on the desired yaw moment and vehicle body generating force. The vehicle body motion realization apparatus of the present invention has the same operation and effect as those of the invention as described above, and therefore, description thereof will be omitted.

The calculating means of the vehicle body motion realization apparatus according to the present invention can be made to operate as below as is the case with the foregoing. Namely, the direction in which the tire generating force acts is calculated for each wheel by means of the performance function in which the desired yaw moment and vehicle body generating force are defined as restriction conditions. In this case, the direction in which the tire generating force acts may also be calculated for each wheel by carrying out linearization of the restriction states of the desired yaw moment and the vehicle body generating force, and also by using the performance function. For example, in a case in which the aforementioned wheels are four in number with two front wheels and two rear wheels, the direction in which the tire generating force acts may be calculated by means of a pseudo-inverse matrix of two rows and four columns prepared from the two restriction conditions of the linearized desired yaw moment and vehicle body generating force and from the performance function.

BEST MODE FOR CARRYING OUT THE INVENTION

Referring now to the attached drawings, an embodiment of the present invention will be hereinafter described in detail.

Initially, using a performance function corresponding to a ratio between a sum of squares of a vehicle body generating force and a yaw moment in an embodiment of the present invention, and a utilization factor ($\mu$ utilization factor) of a road surface friction coefficient $\mu$ between a tire and a road surface, a principle of calculating the acting direction of a resultant of tire generating forces will be described.

First, a description of a relationship between a vehicle body generating force and a yaw moment at the time of critical running will be given.

There has been conventionally derived a control rule which maximizes a vehicle body generating force when a desired yaw moment and a direction in which a vehicle body generating force acts are given. However, there exists a trade-off relationship between the magnitude of vehicle body generating force and the yaw moment, and in a case in which a large yaw moment is obtained, the vehicle body generating force becomes smaller. To this end, when a yaw moment that exceeds the limit is required, it is necessary to consider as to which of the vehicle body generating force and the yaw moment should be prioritized and to adjust inputs (desired vehicle body generating force and yaw moment) to a control rule leading logic. Here, with the aim of utilizing for the aforementioned adjustment, a trade-off relationship between a vehicle body generating force and a yaw moment is derived in an approximate manner.

Figure 1:
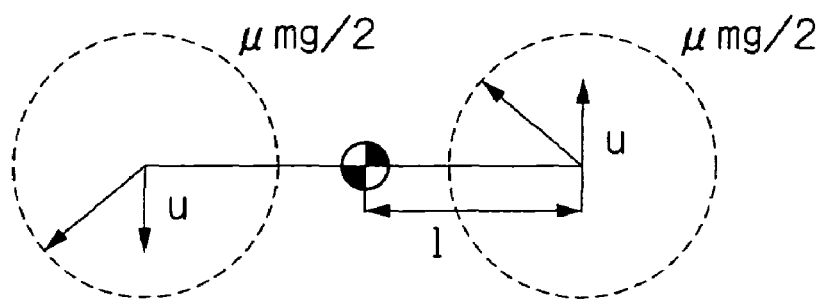
FIG. 1 is a diagram showing a relationship between a critical lateral force and a yaw moment in a vehicle model with right-and-left two wheels.

FIG. 1 represents a vehicle motion model approximated with right-and-left two wheels. In this model, it is assumed that load movement of each of the wheels therebetween is ignored and that lateral forces of critical friction are outputted from both of the right-and-left two wheels. At this time, if braking and driving forces having a magnitude u are applied to each of these right and left wheels, a yaw moment $M_z$ is given as below.

$$M_z = 2lu \tag{1}$$

wherein l represents a distance from the centroid of a vehicle to each wheel. Further, the resultant force F of lateral forces turns out to be the following expression.

$$F = 2\sqrt{\left(\frac{\mu mg}{2}\right)^2 - u^2} \tag{2}$$

wherein $\mu$ represents the road surface $\mu$, m represents the mass of a vehicle, and g represents a gravitational acceleration. From the relationship between them, the following expression (3) is given.

$$\sqrt{(lF)^2 + M_z^2} = l\mu mg \tag{3}$$

Figure 2:
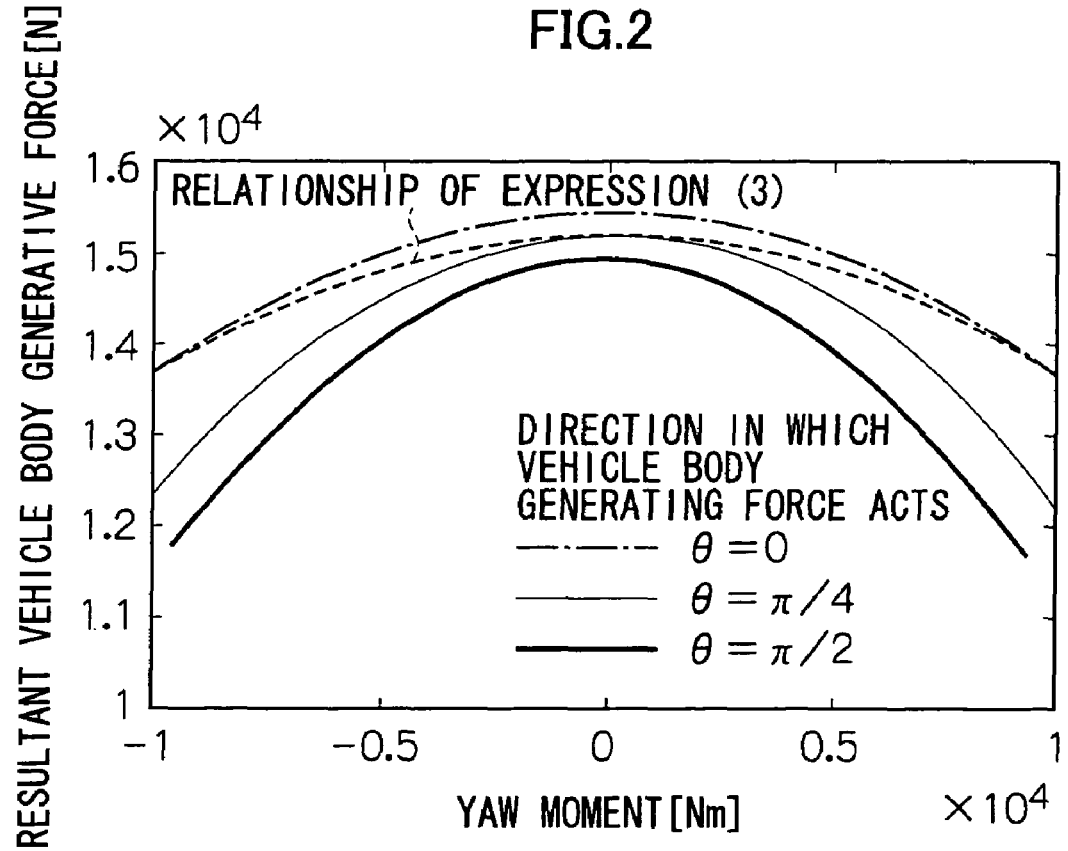
FIG. 2 is a diagram showing a relationship between a vehicle body generating force and a yaw moment when in a critical state.

The expression (3) is discussed on the assumption of no load movement or the like, but it represents the relationship between a vehicle body generating force, a yaw moment and the road surface $\mu$. This expression (3) can also be considered as the extension to a four-wheel model by defining "l" as an average distance between the centroid of a vehicle and a position of each wheel. FIG. 2 shows the relationship of the expression (3) wherein μ=0.78 and l=1.5[m], and the relationship between the yaw moment and a maximized vehicle body generating force when a control rule derived based on a conventional logic (a direction in which a vehicle body generating force acts=0, π/4, π/2, roll rigidity distribution =one by application of an optimum map) in the light of load movement, or even load nonlinear characteristics of a friction circle, is applied to a detailed model in light of load movement of four wheels, or even load nonlinear characteristics of a friction circle. The expression (3) represents the relationship derived on the assumption of no load movement, but it can be found that even in a state in which load movement or load nonlinear characteristics of a friction circle is still further considered, a relatively good approximation is obtained.

Figure 3:
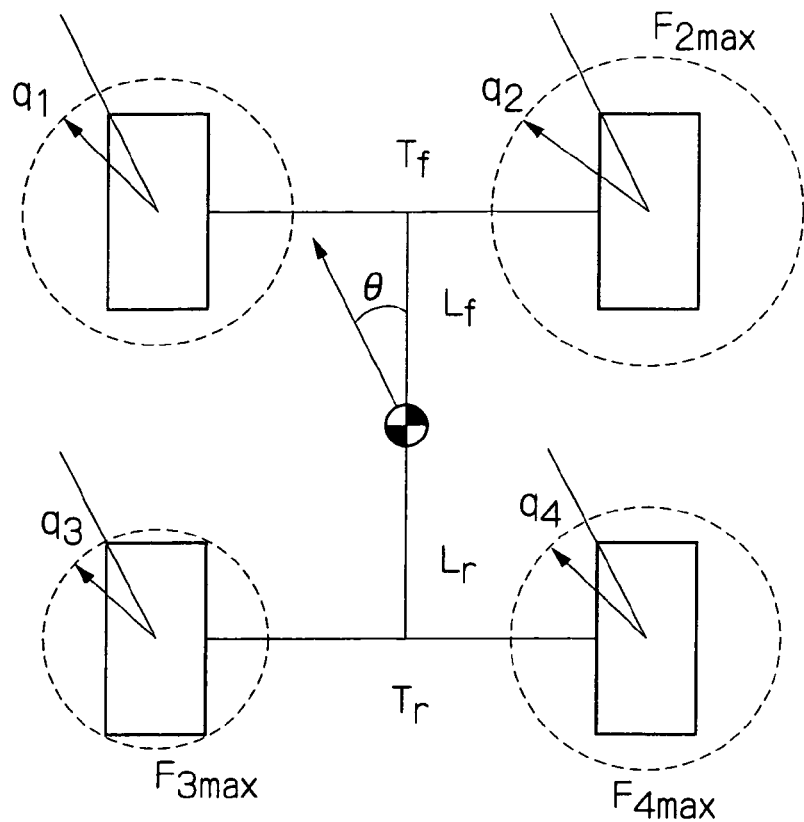
FIG. 3 is a diagram showing a vehicle model.
Figure 4:
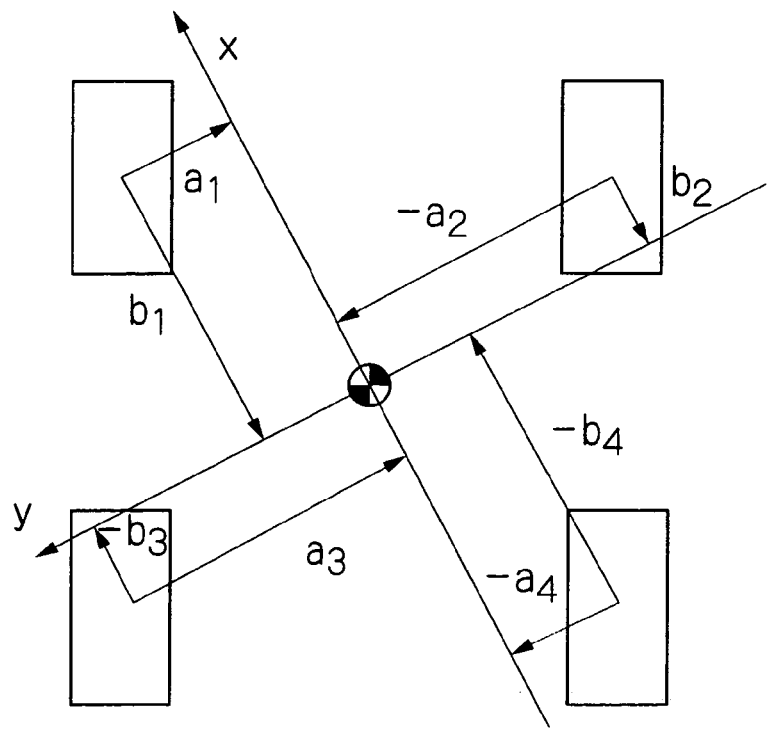
FIG. 4 is a diagram showing a coordinate system corresponding to a vehicle body generating force.

It is assumed that as shown in FIG. 3, a direction θ in which force applied to a vehicle body acts as resultant force of tire generating forces acting on four wheels, and a magnitude $F_{imax}$ (i=1: front left wheel, 2: front right wheel, 3: rear left wheel, and 4: rear right wheel) of a critical friction circle of each of the wheels are known, a direction in which tire generating force acts on each of the wheels (an angle $q_i$ formed by an acting direction of the resultant force and a single-wheel generating force) for uniformly maximizing the grip margin level of each wheel is obtained with desired yaw moment and vehicle body generating force being ensured. To this end, modeling of restriction conditions for ensuring desired yaw moment and vehicle body generating force is first carried out. When coordinate transformation is carried out in which a direction in which the resultant force of tire generating forces on four wheels acts is designated as x axis and a direction perpendicular to the x axis is designated as y axis, a position of each tire, $(x, y)=(a_i, b_i)$, can be described as below (see FIG. 4):

$$a_1 = \frac{T_f}{2}\cos\theta - L_f\sin\theta \quad (4)$$

$$a_2 = -\frac{T_f}{2}\cos\theta - L_f\sin\theta \quad (5)$$

$$a_3 = \frac{T_r}{2}\cos\theta + L_r\sin\theta \quad (6)$$

$$a_4 = -\frac{T_r}{2}\cos\theta + L_r\sin\theta \quad (7)$$

$$b_1 = \frac{T_f}{2}\sin\theta + L_f\cos\theta \quad (8)$$

$$b_2 = -\frac{T_f}{2}\sin\theta + L_f\cos\theta \quad (9)$$

$$b_3 = \frac{T_r}{2}\sin\theta - L_r\cos\theta \quad (10)$$

$$b_4 = -\frac{T_r}{2}\sin\theta - L_r\cos\theta \quad (11)$$

Note that θ is set to be 0 at the time of direct-advance acceleration and the counterclockwise direction is defined as the positive direction. Further, when a yaw moment to be produced around the centroid of a vehicle at a current time point is designated as $M_{z0}$, a vehicle body generating force is designated as $F_0$, and the μ utilization factor of each wheel is designated as γ, the following restriction conditions would exist in the direction in which tire generating force acts on each of the wheels (to define the counterclockwise direction as the positive direction in relation to a direction in which the resultant force of generating forces acts, that is, an angle $q_i$ formed by the acting direction of the resultant force of generating forces and a single-wheel generating force).

$$\gamma F_{1max}\sin q_1 + \gamma F_{2max}\sin q_2 + \gamma F_{3max}\sin q_3 + \gamma F_{4max}\sin q_4 = 0 \quad (12)$$

$$\gamma F_{1max}\cos q_1 + \gamma F_{2max}\cos q_2 + \gamma F_{3max}\cos q_3 + \gamma F_{4max}\cos q_4 = F_0 \quad (13)$$

$$-a_1\gamma F_{1max}\cos q_1 + a_2\gamma F_{2max}\cos q_2 - \\ a_3\gamma F_{3max}\cos q_3 - a_4\gamma F_{4max}\cos q_4 + b_1\gamma F_{1max}\sin q_1 + \\ b_2\gamma F_{2max}\sin q_2 + b_3\gamma F_{3max}\sin q_3 + b_4\gamma F_{4max}\sin q_4 = M_{z0} \quad (14)$$

The aforementioned expression (12) can be described as follows:

$$F_{1\,max}\sin q_1 + F_{2\,max}\sin q_2 + F_{3\,max}\sin q_3 + F_{4\,max}\sin q_4 = 0 \quad (15)$$

Further, when the aforementioned expressions (13) and (14) are organized by deleting γ from each of the expressions (13) and (14), the following expression is given.

$$b_1 F_0 F_{1max}\sin q_1 + b_2 F_0 F_{2max}\sin q_2 + \\ b_3 F_0 F_{3max}\sin q_3 + b_4 F_0 F_{4max}\sin q_4 - \\ (a_1 F_0 + M_{z0})F_{1max}\cos q_1 - (a_2 F_0 + M_{z0})F_{2max}\cos q_2 - \\ (a_3 F_0 + M_{z0})F_{3max}\cos q_3 - (a_4 F_0 + M_{z0})F_{4max}\cos q_4 = 0 \quad (16)$$

The restriction conditions are resultingly described as in the expressions (15) and (16).

When the magnitude of vehicle body generating force required is sufficiently larger than the yaw moment as in the conventional art, the direction in which tire generating force acts on each wheel is close to the direction in which vehicle body generating force acts, and it is considered that the relationship $-\pi/2<q_i<\pi/2$ has been established. In this case, the problem of maximizing the grip margin level, that is, the problem of minimizing the μ utilization factor can be replaced by the problem of obtaining the relationship $-\pi/2<q_i<\pi/2$ that maximizes the following expression (17) as a performance function (first performance function) based on the aforementioned expression (13) that is the restriction condition of vehicle body generating force.

$$J = \frac{F_0}{\gamma} \\ = F_{1max}\cos q_1 + F_{2max}\cos q_2 + F_{3max}\cos q_3 + F_{4max}\cos q_4 \quad (17)$$

Further, if the yaw moment $M_{z0}$ is sufficiently larger than the vehicle body generating force $F_0$, the aforementioned problem can be replaced by a problem of obtaining the relationship $a_i-\pi/2<q_i<a_i+\pi/2$ that maximizes the following expression (18) as a performance function (second performance function) based on the aforementioned expression (14) that is the restriction condition of the yaw moment.

$$J = \frac{1}{\gamma} \quad (18)$$

$$= -\frac{a_1 F_{1max}}{M_{z0}} \cos q_1 - \frac{a_2 F_{2max}}{M_{z0}} \cos q_2 - \frac{a_3 F_{3max}}{M_{z0}} \cos q_3 -$$

$$\frac{a_4 F_{4max}}{M_{z0}} \cos q_4 + \frac{b_1 F_{1max}}{M_{z0}} \sin q_1 + \frac{b_2 F_{2max}}{M_{z0}} \sin q_2 +$$

$$\frac{b_3 F_{3max}}{M_{z0}} \sin q_3 + \frac{b_4 F_{4max}}{M_{z0}} \sin q_4$$

$$= \sum_{i=1}^{4} F_{imax} \sqrt{\left(\frac{a_i}{M_{z0}}\right)^2 + \left(\frac{b_i}{M_{z0}}\right)^2} \cos(q_i - \alpha_i)$$

where $$\alpha_i = -\tan^{-1} \frac{b_i}{a_i} \quad (19)$$

This condition represents that the direction in which tire generating force acts on each wheel generally coincides with the direction in which a desired yaw moment is produced. In this manner, a search region in the acting direction of tire generating force to be obtained varies between a case in which the performance function is set based on the expression (13) that is the restriction condition of vehicle body generating force and a case in which the performance function is set based on the expression (14) that is the restriction condition of yaw moment. In the present embodiment, by taking this property into consideration, a search region adapted to a balance between the magnitudes of desired vehicle body generating force and yaw moment is set by combining these performance functions.

The relationship between the vehicle body generating force and the yaw moment in a critical region is given by the aforementioned expression (3). From the foregoing, by achieving maximization of the following expression (20) serving as the performance function (third performance function), it is considered that the balance between the vehicle body generating force and the yaw moment can be evaluated in a balanced manner.

$$J = \frac{(lF_0)^2 + M_{z0}^2}{\gamma} \quad (20)$$

The aforementioned expression (20) can be described below from the relationship between the expressions (13) and (14).

$$J = \frac{(lF_0)^2 + M_{z0}^2}{\gamma} \quad (21)$$

$$= l^2 F_0 \frac{F_0}{\gamma} + M_{z0} \frac{M_{z0}}{\gamma}$$

$$= \sum_{i=1}^{4} l^2 F_0 F_{imax} \cos q_i + \sum_{i=1}^{4} F_{imax} M_{z0}(-a_i \cos q_i + b_i \sin q_i)$$

$$= \sum_{i=1}^{4} F_{imax} \{(l^2 F_0 - a_i M_{z0}) \cos q_i + b_i M_{z0} \sin q_i\}$$

This problem can be solved by a technique of repeatedly using a pseudo-inverse matrix. First, if the restriction condition of the expression (15) is subjected to Taylor's expansion, it is rewritten as below.

$$\sum_{i=1}^{4} F_{imax} \{\sin q_{i0} + (q_i - q_{i0}) \cos q_{i0}\} = 0 \quad (22)$$

That is, $$\sum_{i=1}^{4} F_{imax} \cos q_{i0} \cdot q_i = \sum_{i=1}^{4} F_{imax} \{q_{i0} \cos q_{i0} - \sin q_{i0}\}$$

Further, Taylor's expansion of the expression (16) is described below.

$$\sum_{i=1}^{4} b_i F_0 F_{imax} \{\sin q_{i0} + (q_i - q_{i0}) \cos q_{i0}\} = \quad (23)$$

$$\sum_{i=1}^{4} (a_i F_0 + M_{z0}) F_{imax} \{\cos q_{i0} - (q_i - q_{i0}) \sin q_{i0}\}$$

That is, $$\sum_{i=1}^{4} F_{imax} \{b_i F_0 \cos q_{i0} + (a_i F_0 + M_{z0}) \sin q_{i0}\} \cdot q_i = \sum_{i=1}^{4} F_{imax}$$

$$\{b_i F_0 (q_{i0} \cos q_{i0} - \sin q_{i0}) + (a_i F_0 + M_{z0})(q_{i0} \sin q_{i0} + \cos q_{i0})\}$$

where $q_{i0}$ is $q_i$ in the previous step. If the expression (21) is approximated with a secondary Taylor's expansion, it can be described as below.

$$J = \sum_{i=1}^{4} F_{imax} \left[ (l^2 F_0 - a_i M_{z0}) \cdot \right. \quad (24)$$

$$\left\{ \cos q_{i0} - \sin q_{i0}(q_i - q_{i0}) - \frac{\cos q_{i0}}{2}(q_i - q_{i0})^2 \right\} +$$

$$b_i M_{z0} \left\{ \sin q_{i0} + \cos q_{i0}(q_i - q_{i0}) - \frac{\sin q_{i0}}{2}(q_i - q_i)^2 \right\} \right] =$$

$$\sum_{i=1}^{4} F_{imax} \left[ -\frac{1}{2} \{(l^2 F_0 - a_i M_{z0}) \cdot \cos q_{i0} + b_i M_{z0} \sin q_{i0}\} q_i^2 + \right.$$

$$\{(l^2 F_0 - a_i M_{z0}) \cdot (q_{i0} \cos q_{i0} - \sin q_{i0}) +$$

$$b_i M_{z0}(q_{i0} \sin q_{i0} + \cos q_{i0})\} q_i +$$

$$(l^2 F_0 - a_i M_{z0}) \cdot \left\{ \left(1 - \frac{q_{i0}^2}{2}\right) \cdot \cos q_{i0} - q_{i0} \cos q_{i0} \right\} +$$

$$b_i M_{z0} \left\{ \left(1 - \frac{q_{i0}^2}{2}\right) \cdot \sin q_{i0} - q_{i0} \cos q_{i0} \right\} \right] = \sum_{i=1}^{4} F_{imax} \left[ -\frac{1}{2} \right.$$

$$\{(l^2 F_0 - a_i M_{z0}) \cdot \cos q_{i0} + b_i M_{z0} \sin q_{i0}\} (q_i - X_i)^2 + Y_i \right]$$

where $$X_i = \frac{(l^2 F_0 - a_i M_{z0}) \cdot (q_{i0} \cos q_{i0} - \sin q_{i0}) + b_i M_{z0}(q_{i0} \sin q_{i0} + \cos q_{i0})}{(l^2 F_0 - a_i M_{z0}) \cdot \cos q_{i0} + b_i M_{z0} \sin q_{i0}}$$

$$Y_i = (l^2 F_0 - a_i M_{z0}) \cdot \left\{ \left(1 - \frac{q_{i0}^2}{2}\right) \cdot \cos q_{i0} + q_{i0} \sin q_{i0} \right\} +$$

-continued $$b_i M_{z0} \left\{ \left(1 - \frac{q_{i0}^2}{2}\right) \cdot \sin q_{i0} - q_{i0} \cos q_{i0} \right\} +$$

$$\frac{\{(l^2 F_0 - a_i M_{z0}) \cdot (q_{i0} \cos q_{i0} - \sin q_{i0}) + b_i M_{z0}(q_{i0} \sin q_{i0} + \cos q_{i0})\}^2}{2(l^2 F_0 - a_i M_{z0}) \cdot \cos q_{i0} + 2 b_i M_{z0} \sin q_{i0}}$$

Here, if the relationship $$(l^2 F_0 - a_i M_{z0}) \cdot \cos q_{i0} + b_i M_{z0} \sin q_{i0} > 0 \quad (25)$$

is given, according to transformation of variable expressed (26) given as below, $$p_i = \sqrt{F_{imax}\{(l^2 F_0 - a_i M_{z0}) \cdot \cos q_{i0} + b_i M_{z0} \sin q_{i0}\}} \cdot (q_i - X_i) \quad (26)$$

the maximization problem of the expression (24) becomes a minimization problem of the expression given as below.

$$K = \sum_{i=1}^{4} p_i^2$$

Incidentally, the condition in the expression (25) turns out to be the sum of a calculation condition when a performance function is set as in the expression (17) based on the expression (13) that is a restriction condition of vehicle body generating force, $$\cos q_{i0} > 0$$

that is, $$l^2 F_0 \cos q_{i0} > 0$$

and a calculation condition when a performance function is set as in the expression (18) based on the expression (14) that is a restriction condition of yaw moment, $$\frac{a_i \cos q_{i0} - b_i \sin q_{i0}}{M_{z0}} < 0$$

that is, $$M_{z0}(-a_i \cos q_{i0} + b_i \sin q_{i0}) > 0,$$

and it can be expected that the aforementioned condition is established even when the vehicle body generating force and the yaw moment have the same level of magnitude. At this time, the expressions (22) and (23) into which the expressions (15) and (16) are subjected to a primary Taylor's expansion, can be respectively described as below (see the following expressions (28) and (29)) from the relation of the following expression (27).

$$q_i = \frac{1}{\sqrt{F_{imax}((l^2 F_0 - a_i M_{z0}) \cdot \cos q_{i0} + b_i M_{z0} \sin q_{i0}\}}} \cdot p_i + X_i \quad (27)$$

$$\sum_{i=1}^{4} \frac{\sqrt{F_{imax}} \cos q_{i0}}{\sqrt{(l^2 F_0 - a_i M_{z0}) \cdot \cos q_{i0} + b_i \cdot M_{z0} \sin q_{i0}}} \cdot p_i = \quad (28)$$

$$\sum_{i=1}^{4} F_{imax}\{q_{i0} \cos q_{i0} - \sin q_{i0} - X_i \cos q_{i0}\}$$

$$\sum_{i=1}^{4} \frac{\sqrt{F_{imax}} \{b_i F_0 \cos q_{i0} + (a_i F_0 + M_{z0}) \sin q_{i0}\}}{\sqrt{(l^2 F_0 - a_i M_{z0}) \cdot \cos q_{i0} + b_i M_{z0} \sin q_{i0}}} \cdot p_i = \quad (29)$$

$$\sum_{i=1}^{4} F_{imax}\{b_i F_0 (q_{i0} \cos q_{i0} - \sin q_{i0} - X_i \cos q_{i0}) +$$

$$(a_i F_0 + M_{z0})(q_{i0} \sin q_{i0} + \cos q_{i0} - X_i \sin q_{i0})\}$$

Accordingly, $q_i$ that satisfies the expressions (22) and (23) and maximizes the expression (24), that is, minimizes the utilization factor $\gamma$ of $\mu$ can be obtained by repeatedly calculating the following recurrence formula:

$$\begin{bmatrix} q_1 \\ q_2 \\ q_3 \\ q_4 \end{bmatrix} = \quad (30)$$

$$\text{diag}[D_1 \; D_2 \; D_3 \; D_4] \cdot \begin{bmatrix} E_{11} & E_{12} & E_{13} & E_{14} \\ E_{21} & E_{22} & E_{23} & E_{24} \end{bmatrix}^+ \cdot \begin{bmatrix} G_1 \\ G_2 \end{bmatrix} + \begin{bmatrix} X_1 \\ X_2 \\ X_3 \\ X_4 \end{bmatrix}$$

where $$D_i = \frac{1}{\sqrt{F_{imax}\{(l^2 F_0 - a_i M_{z0}) \cdot \cos q_{i0} + b_i M_{z0} \sin q_{i0}\}}}$$

$$E_{1i} = \frac{\sqrt{F_{imax}} \cos q_{i0}}{\sqrt{(l^2 F_0 - a_i M_{z0}) \cdot \cos q_{i0} + b_i M_{z0} \sin q_{i0}}}$$

$$E_{2i} = \frac{\sqrt{F_{imax}} \cdot \{b_i F_0 \cos q_{i0} + (a_i F_0 + M_{z0}) \sin q_{i0}\}}{\sqrt{(l^2 F_0 - a_i M_{z0}) \cdot \cos q_{i0} + b_i M_{z0} \sin q_{i0}}}$$

$$G_1 = \sum_{i=1}^{4} F_{imax}\{q_{i0} \cos q_{i0} - \sin q_{i0} - X_i \cos q_{i0}\}$$

$$G_2 = \sum_{i=1}^{4} F_{imax}\{b_i F_0 (q_{i0} \cos q_{i0} - \sin q_{i0} - X_i \cos q_{i0}) +$$

$$(a_i F_0 + M_{z0})(q_{i0} \sin q_{i0} + \cos q_{i0} - X_i \sin q_{i0})\}$$

In the foregoing, $E^+$ represents a pseudo-inverse matrix. If it is assumed that E is a full row rank, $E^+$ can be obtained as below.

$$E^+ = E^T \cdot (E \cdot E^T)^{-1}$$

The expression (30) uses the nature that calculation of a pseudo-inverse matrix satisfies the restriction condition and derives a solution $P_i$ that minimizes the Euclidean norm given as below.

$$K = \sum_{i=1}^{4} P_i^2$$

Next, a description will be given of a specific structure of the present embodiment.

Figure 5:
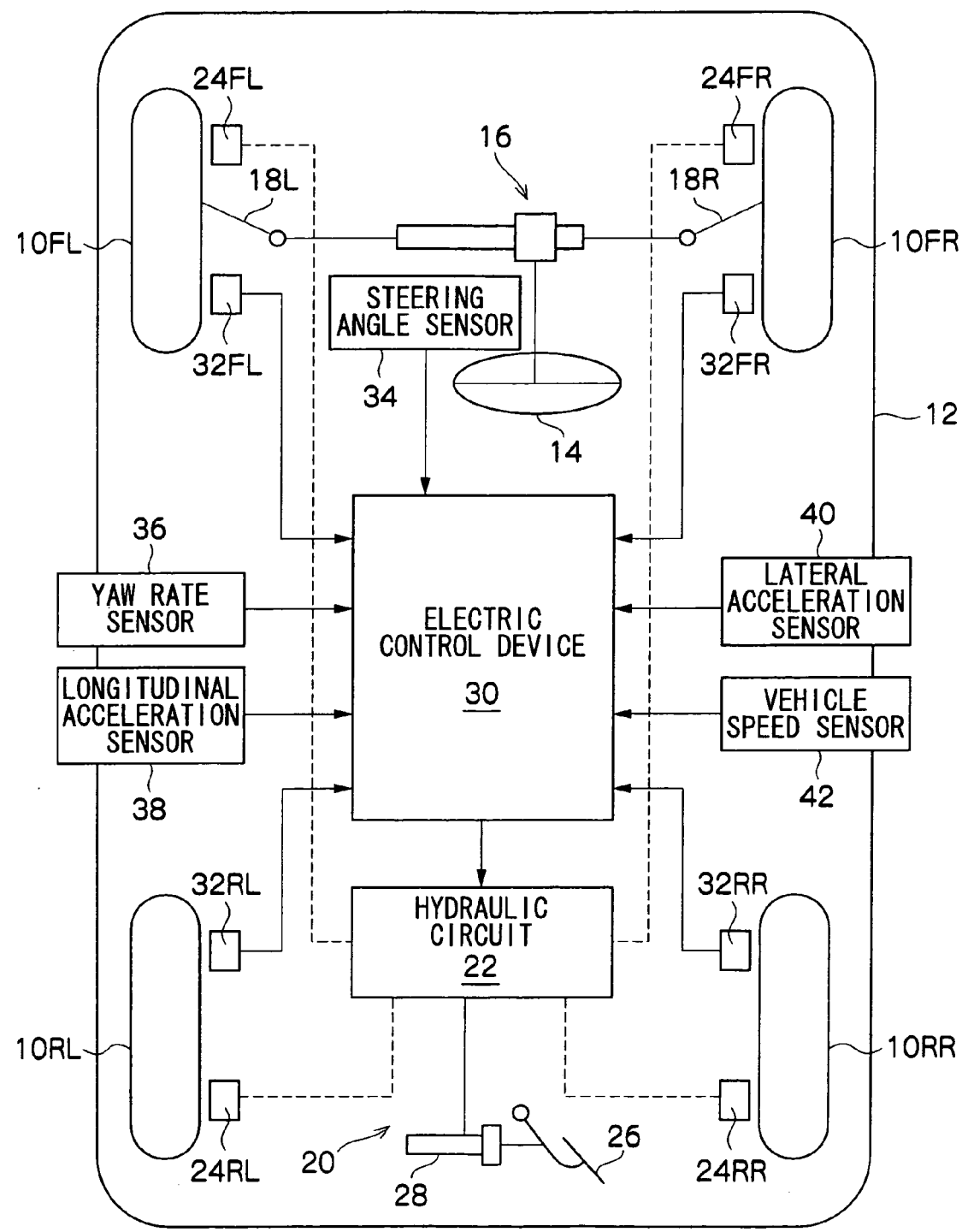
FIG. 5 is schematic structural diagram of a vehicle body motion realization apparatus according to an embodiment of the present invention.

FIG. 5 shows a vehicle body motion realization apparatus for realizing the vehicle body motion realization method of the present embodiment. Front left and front right wheels of a vehicle 12 are designated as 10FL and 10FR, respectively, and rear left and rear right wheels which are driving wheels of the vehicle are designated as 10RL and 10RR, respectively. The front left and right wheels 10FL and 10FR which serve as a coupled driving wheel and a steering wheel are steered by a power steering device 16 of rack and pinion type driven in response to manipulation of a steering wheel 14 by a vehicle operator via tie rods 18L and 18R.

The braking force of each wheel is controlled by controlling a braking pressure of each of wheel cylinders 24FR, 24FL, 24RR and 24RL using a hydraulic circuit 22 of a braking device 20. Although not shown in the drawing, the hydraulic circuit 22 includes a reservoir, an oil pump, various valve devices and the like. The braking pressure of each wheel cylinder is, at a normal operation, controlled by a master cylinder 28 driven in accordance with a pressing operation of a brake pedal 26 by a driver. Further, if necessary, the braking pressure is controlled by an electric control device 30 as will be described below in detail.

These wheels 10FR to 10RL are respectively provided with vehicle speed sensors 32FR, 32FL, 32RR and 32RL which each detect a wheel speed Vwi (i=fr (front right wheel), fl (front left wheel), rr (rear right wheel), rl (rear left wheel)). A steering column to which the steering wheel 14 is connected is provided with a steering angle sensor 34 that detects a steering angle φ. Further, the vehicle 12 is provided with a yaw rate sensor 36 that detects a raw rate r of the vehicle, a longitudinal acceleration sensor 38 that detects a longitudinal acceleration Gx, a lateral acceleration sensor 40 that detects a lateral acceleration Gy, and a vehicle speed sensor 42 detects a vehicle speed V. Incidentally, the steering angle sensor 34, yaw rate sensor 36 and lateral acceleration sensor 40 detect the steering angle, raw rate and lateral acceleration, respectively, of which positive direction is defined along the left turning direction of the vehicle.

As shown in the drawing, signals which indicate wheel speed Vwi detected by the wheel speed sensors 32FR to 32RL, a signal that indicates a steering angle φ detected by the steering angle sensor 34, a signal that indicates a yaw rate r detected by the yaw rate sensor 36, a signal that indicates a longitudinal acceleration Gx detected by the longitudinal acceleration sensor 38, a signal that indicates a lateral acceleration Gy detected by the lateral acceleration sensor 40, and a signal that indicates a vehicle speed V detected by the vehicle speed sensor 42 are inputted to the electric control device 30. Although not specifically shown in the drawing, the electric control device 30 comprises, for example, CPU, ROM, RAM, and an input/output port device, and includes a microcomputer having a general structure in which the aforementioned elements are connected together by a bilateral common bus. ROM stores therein a vehicle body motion realization program for realizing the vehicle body motion realization method.

Figure 6:
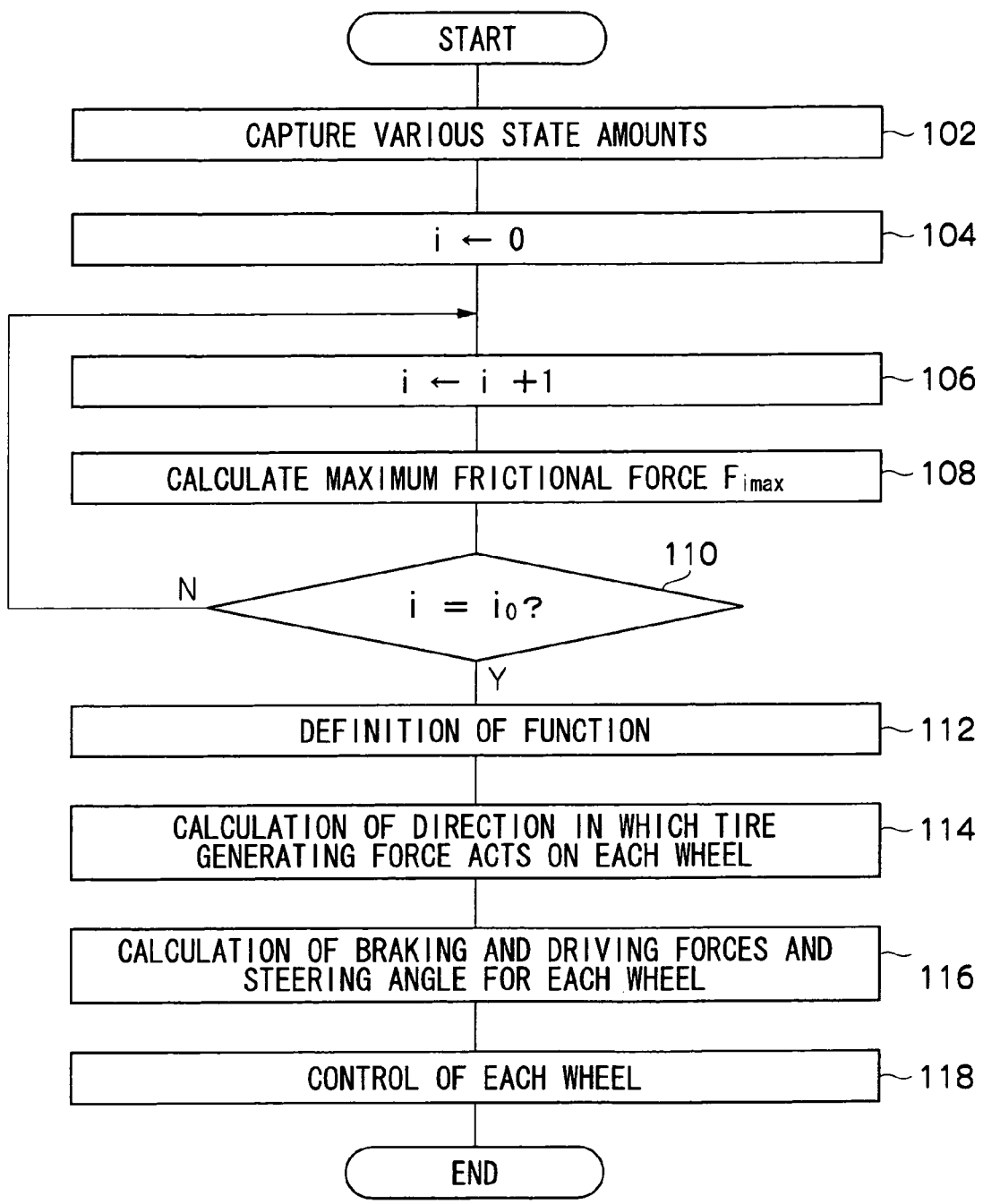
FIG. 6 is a flow chart showing a vehicle body motion realization program for realizing a vehicle body motion realization method.

Next, the operation of the present embodiment will be described with reference to the flow chart of a vehicle body motion realization program shown in FIG. 6.

In step 102, various state amounts of a vehicle body detected by the aforementioned various sensors are captured.

In step 104, variable i for identifying each wheel is initialized. In step 106, the variable i is incremented.

In step 108, the maximum frictional force $F_{imax}$ for a wheel identified as the variable i is calculated.

In step 110, it is determined whether the variable i equals the total number $i_0$ of wheels (in the present embodiment, four) or not. If it is determined that the variable i does not equal the total number $i_0$, there still exists some wheel for which the maximum frictional force $F_{imax}$ has not yet been calculated. Therefore, the routine returns to step 106, and the aforementioned step (step 108) is executed.

Conversely, if it is determined that the variable i equals the total number $i_0$, there exists no wheel for which the maximum frictional force $F_{imax}$ has not been calculated. Then, in step 112, the function shown in the expression (30) is defined using the maximum frictional forces $F_{imax}$ obtained by the aforementioned calculation, and other physical quantities. In step 114, the direction in which tire generating force acts on each wheel ($q_i$) is calculated using the function (the expression (30)). In step 116, by means of the calculated directions in which tire generating forces act on respective wheels, and the like, the braking and driving forces and steering angle of each wheel are obtained. In step 118, each wheel is controlled based on the obtained braking and driving forces and steering angle of the wheel.

As described above, according to the present embodiment, a performance function not dependent on respective magnitudes of the vehicle body generating force and the yaw moment, and therefore, as long as the direction in which the tire generating force acts, which is calculated from the performance function, is used, a predetermined vehicle body motion can be properly realized.

Further, in the present embodiment, the direction in which the resultant force of tire generating forces is obtained using desired yaw moment and vehicle body generating force as the restriction conditions. Therefore, it is possible to realize the desired yaw moment and vehicle body generating force and obtain a predetermined vehicle body motion with a high degree of accuracy.

Moreover, in the present embodiment, the restriction conditions of the desired yaw moment and vehicle body generating force are linearized to minimize the utilization factor of longitudinal friction coefficient, thereby resulting in reduction of calculating load.

In the present embodiment, the direction in which the tire generating force acts is calculated for each of the wheels so as to realize the desired yaw moment and vehicle body generating force. This also means that, under the restriction conditions for realization of the desired yaw moment and vehicle body generating force, the grip margin level of each wheel is uniformly maximized, that is, the μ utilization factor is minimized.

In the embodiment as mentioned above, the pseudo-inverse matrix is simply calculated repeatedly, but the present invention is not limited to the same. Alternatively, a penalty function may also be used.

A penalty function having a combination of an evaluation on a deviation between a performance function J(q) to be maximized and the restriction condition is defined in the following expression given as below.

$$P(q) = \frac{1}{J(q)} + \rho(|J_{Fy}(q)| + |J_{FMz}(q)|) \qquad (31)$$

where $J_{Fy}(q)$ is the left side of the expression (15), $J_{FMz}(q)$ is the left side of the expression (16), and $\rho$ is a positive number. Here, the solution q of the expression (30), and the penalty function relevant to a search point q0 in the previous step are calculated. If $p(q)<P(q_0)$, the recurrence formula (30) is recalculated with $q=q_0$. Further, if $p(q)>P(q_0)$, the expression $\tilde{q}=(q+q_0)/2$ is considered as the next candidate search point, and the penalty function relevant to $\tilde{q}$ is calculated.

In this case, if $P(\tilde{q})<P(q)$, the recurrence formula of the expression (30) is calculated again with $q0=\tilde{q}$. Further, if $P(\tilde{q})>P(q)$, the calculation $\tilde{q}=(\tilde{q}+Q_0)/2$ is carried out repeatedly until the relation $P(\tilde{q})<P(q)$ is satisfied, and the step of constantly decrementing the penalty function is carried out, thereby achieving convergence of the recurrence formula.

The convergence of the recurrence formula ($q_i=q_{i0}$) satisfies algebraic equations (22) and (23) into which the expressions (15) and (16) are linearized around $q_{i0}$, and means that $q_i$ which maximizes the expression (24) into which the expression (21) is approximated around $q_{i0}$ becomes $q_i=q_{i0}$. Assuming $q_i=q_{i0}$ in the expressions (22) and (23), the following expressions are given as below.

$$F_{1max}\sin q_{10} + F_{2max}\sin q_{20} + F_{3max}\sin q_{30} + F_{4max}\sin q_{40} = 0 \qquad (32)$$

$$B_1 F_0 F_{1max}\sin q_{10} + b_2 F_0 F_{2max}\sin q_{20} + \\ b_3 F_0 F_{3max}\sin q_3 + b_4 F_0 F_{4max}\sin q_{40} - \\ (a_1 F_0 + M_{z0}) F_{1max}\cos q_{10} - (a_2 F_0 + M_{z0}) F_{2max}\cos q_{20} - \\ (a_3 F_0 + M_{z0}) F_{3max}\cos q_{30} - (a_4 F_0 + M_{z0}) F_{4max}\cos q_{40} = 0 \qquad (33)$$

Thus, it can be understood that $q_{i0}$ satisfies the expressions (15) and (16) and becomes a local optimum solution that maximizes the evaluation function of the expression (21).

Incidentally, the $\mu$ utilization factor $\gamma$ is calculated from the value $q_i$ thus derived, based on the following expression (34).

$$\gamma = \frac{(lF_0)^2 + M_{z0}^2}{\sum_{i=1}^{4} F_{imax}\{(l^2 F_0 - a_i M_{z0})\cos q_i + b_i M_{z0}\sin q_i\}} \qquad (34)$$

The logic of the expression (30) can be solved within a domain in which the expression (25) is established, and therefore, an initial value of the recurrence formula also needs to be set within this domain. The expression (25) can be described as below.

$$(l^2 F_0 - a_i M_{z0})\cdot\cos q_{i0} + b_i M_{z0}\sin q_{i0} = \\ \sqrt{(l^2 F_0 - a_i M_{z0})^2 + (b_i M_{z0})^2} \cdot \cos(q_{i0} - \alpha_i) > 0 \qquad (35)$$

where $$\alpha_i = \tan^{-1}\frac{b_i M_{z0}}{l^2 F_0 - a_i M_{z0}} \qquad (36)$$

Therefore, it is believed that the following expression (37) is an initial value of the expression (30).

$$q_{i0} = \alpha_i = \tan^{-1}\frac{b_i M_{z0}}{l^2 F_0 - a_i M_{z0}} \qquad (37)$$

This angle represents the direction in which the tire generating force acts on each of wheels when the desired vehicle body generating force and yaw moment are obtained by generating the tire generating force acting on each wheel in the direction in which the vehicle body generating force acts, which direction is expressed below, $$F_{F0} = \frac{F_0}{4} \qquad (38)$$

and also in the direction in which the yaw moment is produced, which direction is expressed below, $$F_{Mz0} = \frac{M_{z0}}{4l}. \qquad (39)$$

Further, the $\mu$ utilization ratio $\gamma$ having a value of 1 or more in the calculation based on the expression (34) represents that a target vehicle body generating force and a target yaw moment cannot be achieved under characteristics of tire generating force at the current time point. At this time, if the direction in which tire generating force acts, which is calculated by the expression (30), is realized by the magnitude of a critical friction circle, the vehicle body generating force of $F_0/\gamma$ and the yaw moment of $Mz_0/\gamma$ are obtained. This means that when the target values of vehicle body generating force and yaw moment cannot be achieved, the vehicle body generative force and the yaw moment are uniformly made smaller until respective achievable values thereof are both obtained.

FIGS. 7A to 7D are results of the directions in which generating forces act on respective wheels obtained based on the expression (30), as an example of calculation, when the direction in which the vehicle body generating force acts is expressed as $\pi/2$. In this case, the recurrence formula of the expression (30) is solved with l=1.5 m. In the case shown in FIG. 7A, that is, when the target vehicle body generating force is larger compared with the target yaw moment ($F_0$=1000[N], $M_{z0}$=1000[Nm]) and the $\mu$ utilization ratio $\gamma$ of each wheel is 0.6585, and also in the case shown in FIG. 7B, that is, when the target yaw moment is larger compared with the target vehicle body generating force ($F_0$=1000[N], $M_{z0}$=10000[Nm]) and the $\mu$ utilization ratio $\gamma$ of each wheel is 0.4218, it can be understood that proper solutions can be obtained for both of the target values. Incidentally, in cases shown in FIGS. 7A and 7B, the following relationship is obtained.

$(l^2 F_0 - a_j M_{z0})\cos q_{i0} + b_i M_{z0}\sin q_{i0} > 0$

Figure 7A:
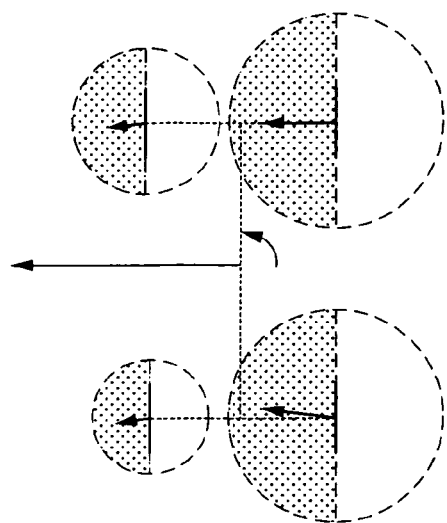
FIGS. 7A to 7D are diagrams showing calculation results for directions in which generating forces act on respective wheels according to the embodiment of the present invention.
Figure 7B:
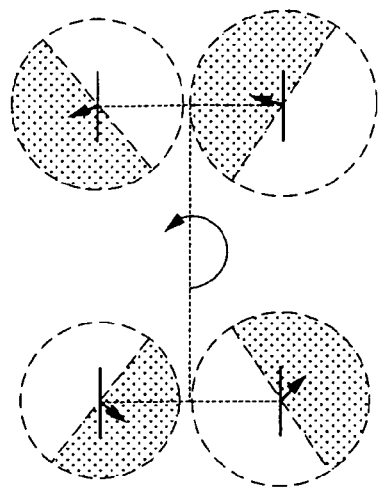
Figure 7C:
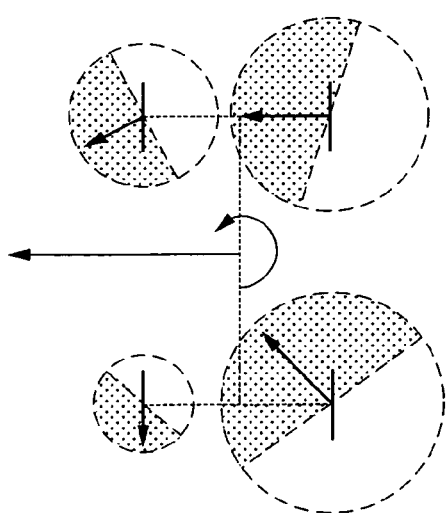
Figure 7D:
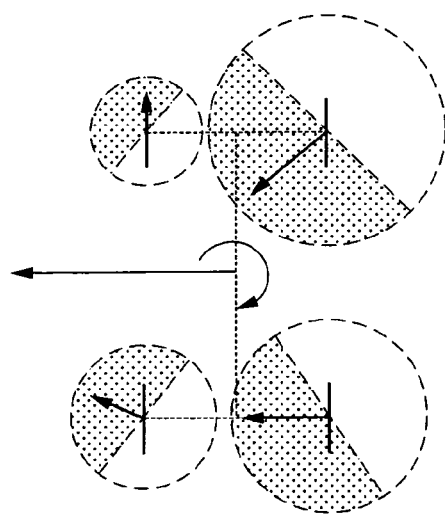

Further, even in cases shown in FIGS. 7C and 7D, that is, even when the target vehicle body generating force and the target yaw moment are both set to be large values ($F_0$=10000[N], $M_{z0}$=±10000[Nm] (in FIG. 7C, $M_{z0}$=10000[Nm], and in FIG. 7D, $M_{z0}$=−10000[Nm]), it can be understood that appropriate solutions are obtained. Moreover, a domain in which the expression (31) is established, which domains corresponds to a search domain of the optimum solution, is indicated by dots in the diagrams shown in FIG. 7. These domains vary properly in accordance with the magnitudes of vehicle body generating force and yaw moment both to be required. As a result, it can be understood that the logic for obtaining the direction in which generating force acts on each wheel does not need to be switched to another based on the magnitudes of the vehicle body generating force and the yaw moment, and the direction in which generative force acts on each wheel can be constantly calculated using the expression (30).

Effects of the Invention

As described above, the present invention has the effect that, since a performance function including respective magnitudes of a vehicle body generating force and a yaw moment is used, as long as a direction in which a tire generating force acts, calculated from the performance function, is used, a predetermined vehicle body motion can be properly realized regardless of a balance of magnitudes of desired vehicle body generating force and yaw moment.

What is claimed is:

1. A vehicle body motion realization method, comprising:
    calculating a direction in which tire generating force acts for each wheel of a vehicle by means of a performance function including the direction in which tire generating force acts, so as to realize desired yaw moment and vehicle body generating force for obtaining a predetermined vehicle body motion, and the vehicle body motion is realized by using the calculated direction in which the tire generating force acts,
    wherein said performance function is a performance function corresponding to a ratio between a sum of respective squares of the desired vehicle body generating force and yaw moment, and a utilization factor of a road surface frictional coefficient that is a frictional coefficient between a road surface which is supposed to have a constant condition for each of wheels, and a tire; and
    at least one of regulating a steering angle of each wheel and regulating braking and driving forces of each wheel based on the calculated direction in which the tire generating force acts.

2. The vehicle body motion realization method according to claim 1, wherein the direction in which the tire generating force acts is calculated for each wheel by means of the performance function in which the desired yaw moment and vehicle body generating force are defined as restriction conditions.

3. The vehicle body motion realization method according to claim 2, wherein the direction in which the tire generating force acts is calculated for each wheel by carrying out linearization of the restriction conditions of the desired yaw moment and vehicle body generating force and also using said performance function.

4. The vehicle body motion realization method according to claim 3, wherein said wheels are four in number with two front wheels and two rear wheels, and
    wherein the direction in which the tire generating force acts is calculated for each wheel by means of a pseudo-inverse matrix of two lines and four columns, which is prepared from the two restriction conditions of said linearized desired yaw moment and vehicle body generating force and the performance function.

5. A vehicle body motion realization apparatus comprising:
    calculating means that calculates a direction in which tire generating force acts for each wheel based on detecting means for detecting state amounts of a vehicle, and a performance function including a direction in which tire generating force acts, so as to realize desired yaw moment and vehicle body generating force for obtaining a predetermined vehicle body motion; and
    control means that controls at least one of a steering angle of each wheel and braking and driving forces of each wheel based on the direction in which the tire generating force acts, which direction is calculated by said calculating means for each wheel, a value of the performance function used in calculation of the direction in which the tire generating force acts, and a utilization factor of a road surface frictional coefficient, that is, a frictional coefficient between a road surface and a tire, which utilization factor is calculated based on the desired yaw moment and vehicle body generating force, wherein said performance function is a performance function corresponding to a ratio between a sum of respective squares of the desired vehicle body generating force and yaw moment, and a utilization factor of a road surface frictional coefficient that is a frictional coefficient between a road surface which is supposed to have a constant condition for each of wheels, and a tire.

* * * * *